(12) United States Patent
Aday et al.

(10) Patent No.: US 12,488,107 B2
(45) Date of Patent: Dec. 2, 2025

(54) IDENTIFICATION OF VARIANTS OF ARTIFICIAL INTELLIGENCE GENERATED MALWARE

(71) Applicant: MICRO FOCUS LLC, Santa Clara, CA (US)

(72) Inventors: Michael A. Aday, Carrollton, TX (US); Douglas Max Grover, Rigby, ID (US); Michael F. Angelo, Houston, TX (US)

(73) Assignee: Micro Focus LLC, Santa Clara, CA (US)

( * ) Notice: Subject to any disclaimer, the term of this patent is extended or adjusted under 35 U.S.C. 154(b) by 126 days.

(21) Appl. No.: 18/208,016

(22) Filed: Jun. 9, 2023

(65) Prior Publication Data

US 2024/0411881 A1    Dec. 12, 2024

(51) Int. Cl.
*G06F 21/00* (2013.01)
*G06F 21/56* (2013.01)

(52) U.S. Cl.
CPC ...... *G06F 21/566* (2013.01); *G06F 2221/033* (2013.01)

(58) Field of Classification Search
CPC .................. G06F 21/566; G06F 2221/033
See application file for complete search history.

(56) References Cited

U.S. PATENT DOCUMENTS

| 9,330,259 | B2 | 5/2016 | Klein | |
|---|---|---|---|---|
| 10,360,381 | B2 | 7/2019 | Barak | |
| 11,277,423 | B2 | 3/2022 | Brown | |
| 2022/0058264 | A1 | 2/2022 | Grover | |
| 2023/0208858 | A1* | 6/2023 | Mishra | H04L 63/1416 726/23 |
| 2023/0342466 | A1* | 10/2023 | Briliauskas | G06F 21/566 |

FOREIGN PATENT DOCUMENTS

WO    WO-2014122662 A1 *  8/2014  ............. G06F 21/53

* cited by examiner

*Primary Examiner* — Tri M Tran
(74) *Attorney, Agent, or Firm* — Sheridan Ross P.C.

(57) ABSTRACT

Source code for a type of malware is received. For example, the source code may be source code from a type of computer virus. An Artificial Intelligence (AI) algorithm is identified. For example, the AI algorithm may be ChatGPT. The source code of the type of malware is run through the AI algorithm to produce mutated source code for the type of malware. A prediction algorithm is used to predict a signature of the mutated source code for the type of malware. For example, the prediction algorithm is trained using existing source code of different types of malware to generate a prediction model. The signature of the mutated source code for the type of malware is then compared to a signature of a potentially new type of malware to determine if the signatures are similar.

20 Claims, 9 Drawing Sheets

IDENTIFICATION OF VARIANTS OF ARTIFICIAL INTELLIGENCE GENERATED MALWARE

FIELD

The disclosure relates generally to identification of malicious programs and particularly to identification of malicious programs that are generated by machine learning.

BACKGROUND

One of the problems with the analysis of traditional malware is that the malware may mutate. This problem has become even more prevalent with the use of Artificial Intelligence (AI) software such as ChatGPT. Hackers are using these AI programs to generate mutated versions of malware. These mutated versions of the malware are making the malware difficult to detect and are thus comprising network security.

SUMMARY

These and other needs are addressed by the various embodiments and configurations of the present disclosure. The present disclosure provides a number of advantages depending on the particular configuration. These and other advantages will be apparent from the disclosure contained herein.

Source code for a type of malware is received. For example, the source code may be source code from a type of computer virus. An Artificial Intelligence (AI) algorithm is identified. For example, the AI algorithm may be ChatGPT. The source code of the type of malware is run through the AI algorithm to produce mutated source code for the type of malware. A prediction algorithm is used to predict a signature of the mutated source code for the type of malware. For example, the prediction algorithm is trained using existing source code of different types of malware to generate a prediction model. The signature of the mutated source code for the type of malware is then compared to a signature of a potentially new type of malware to determine if the signatures are similar.

The phrases "at least one", "one or more", "or," and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate" and "compute," and variations thereof, as used herein, are used interchangeably, and include any type of methodology, process, mathematical operation, or technique.

The term "means" as used herein shall be given its broadest possible interpretation in accordance with 35 U.S.C., Section 112 (f) and/or Section 112, Paragraph 6. Accordingly, a claim incorporating the term "means" shall cover all structures, materials, or acts set forth herein, and all the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Figure 1:
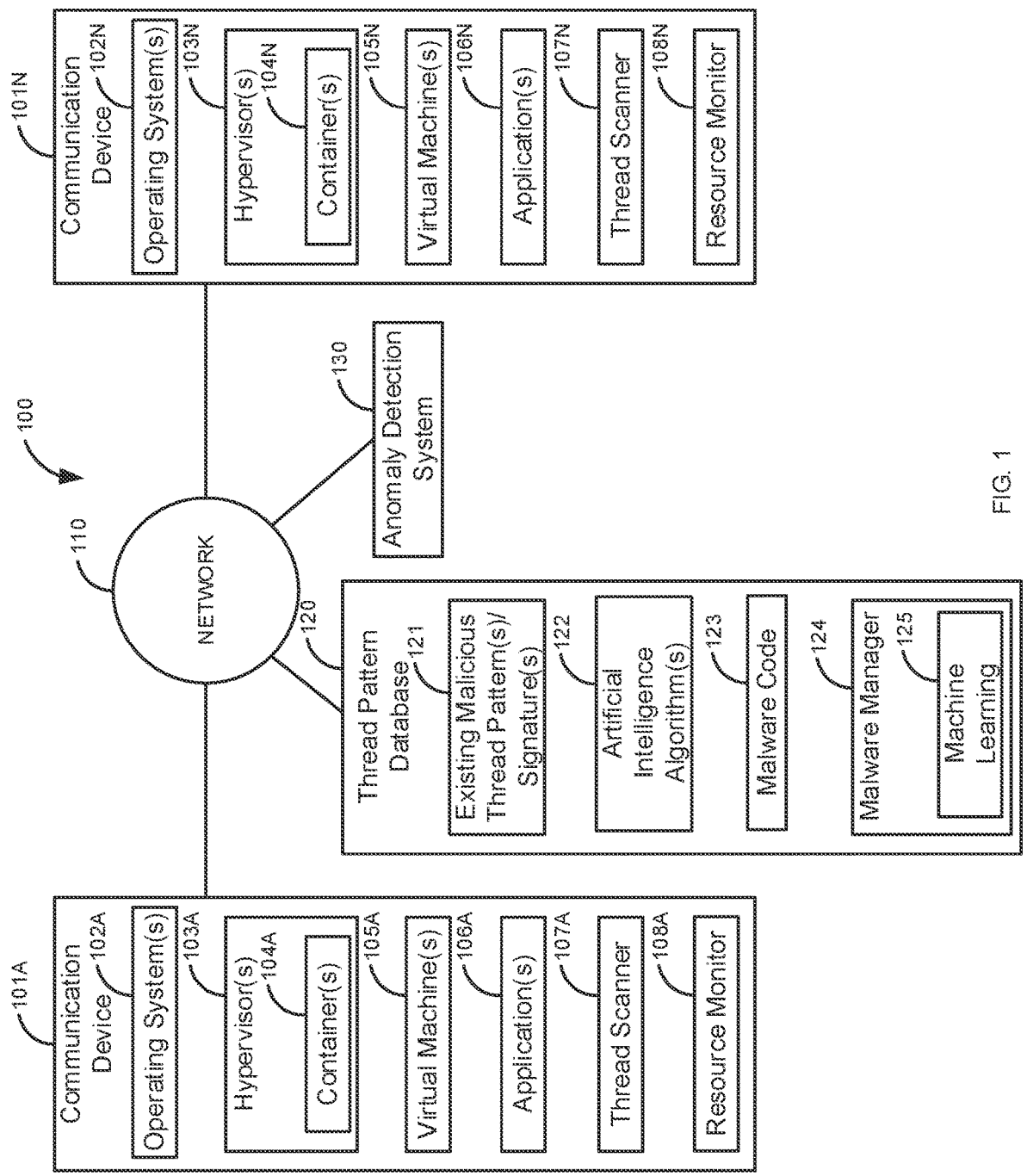
FIG. 1 is a block diagram of a first illustrative system for identifying malicious programs using thread patterns/signatures and related data.

FIG. 1 is a block diagram of a first illustrative system 100 for identifying malicious programs using thread patterns/signatures and related data. The first illustrative system 100 comprises communication devices 101A-101N, a network 110, a thread pattern database 120, and an anomaly detection system 130.

The communication devices 101A-101N can be or may include any device that can communicate on the network 110, such as a Personal Computer (PC), a telephone, a video system, a cellular telephone, a Personal Digital Assistant (PDA), a tablet device, a notebook device, a smartphone, a server, an embedded device, and/or the like. As shown in FIG. 1, any number of communication devices 101A-101N may be connected to the network 110. The communication devices 101A-101N further comprise operating systems 102A-102N, hypervisors 103A-103N, virtual machines 105A-105N, applications 106A-106N, thread scanners 107A-107N, and resource monitors 108A-108N.

The operating systems 102A-102N can be any type of operating system, such a, Microsoft Windows®, Linux®, MacOS®, iOS®, an android operating System®, a batch operating system, a time-sharing operating system, a network operating system, a real-time operating system, and/or the like.

The hypervisors 103A-103N can be any type of hypervisor, such as, a type 1 (bare metal) hypervisor, a type 2 hypervisor (hosted), and/or the like. The hypervisors 103A-103N further comprise one or more containers 104A-104N. A container 104 may be any type of container 104, such as, a Docker container, a Kubernetes container, LXC/LXD container, an Open VZ/Virtuozzo container, a BSD jails container, a Linux vServer container, and/or the like.

The virtual machines 105A-105N can be or may include any type of virtual machine 105, such as, a process virtual machine 104, a system virtual machine 104, and/or the like.

The application(s) 106A-106N can be any type of application, such as, a database application, a security application, a communication application, a web application, a network application, a financial application, a word processing application, a spreadsheet application, an email application, and/or the like. In one embodiment, the application 106 may have its own internal thread scanner 107 that runs full time. In this embodiment, the thread scanner 107 in the application 106 will get any application specific thread patterns.

The thread scanners 107A-107N can be any type of process that can capture and gather thread information, such as, capturing a thread dump, capturing a Java thread dump, capturing multi-device thread dumps (e.g., a client thread dump/server thread dump), and/or the like.

The resource monitors 108A-108N can be or may include any type of process that can gather information about/from resources, such as operating systems 102A-102N, Central Processing Units (CPUs), memory (e.g., Random Access Memory), disk space, disk access periods, hypervisor 103 types, container 104 types, virtual machine 105 types, application types, network ports (e.g., from a firewall), input devices, connection attempts, accounts added or deleted, and/or the like.

The network 110 can be or may include any collection of communication equipment that can send and receive electronic communications, such as the Internet, a Wide Area Network (WAN), a Local Area Network (LAN), a packet switched network, a circuit switched network, a cellular network, a combination of these, and the like. The network 110 can use a variety of electronic protocols, such as Ethernet, Internet Protocol (IP), Session Initiation Protocol (SIP), H.323, Hyper Text Transfer Protocol (HTTP), Web Real-Time Protocol (Web RTC), and/or the like. Thus, the network 110 is an electronic communication network configured to carry messages via packets and/or circuit switched communications. The network 110 may comprise multiple networks 110. For example, each of the communication devices 101A-101N may be on separate networks 110 connected to the Internet.

The thread pattern database 120 can be or may include any hardware coupled with software that can store and manage malicious thread patterns, such as, a database server, a security server, a network server, a type of communication device 101, and/or the like. The thread pattern database 120 may be provided by a third party. For example, the thread pattern database 120 may be a cloud service that provides malware detection for multiple tenants/corporations. The thread pattern database 120 further comprises one or more existing malicious thread pattern(s)/signature(s) 121, one or more Artificial Intelligence (AI) algorithms 122, malware code 123, and a malware manager 124.

The existing malicious thread pattern(s)/signature(s) 121 are thread patterns associated with malicious code, such as, a thread pattern of a virus, a thread pattern of malware, a thread pattern of program of code that attacks the application(s) 106A-106N/network 110, and/or the like. The malicious thread patterns 121 may be learned over time from multiple networks of different tenants of the cloud service. The signature(s) 121 are projected signatures for AI generated source code.

Figure 6:
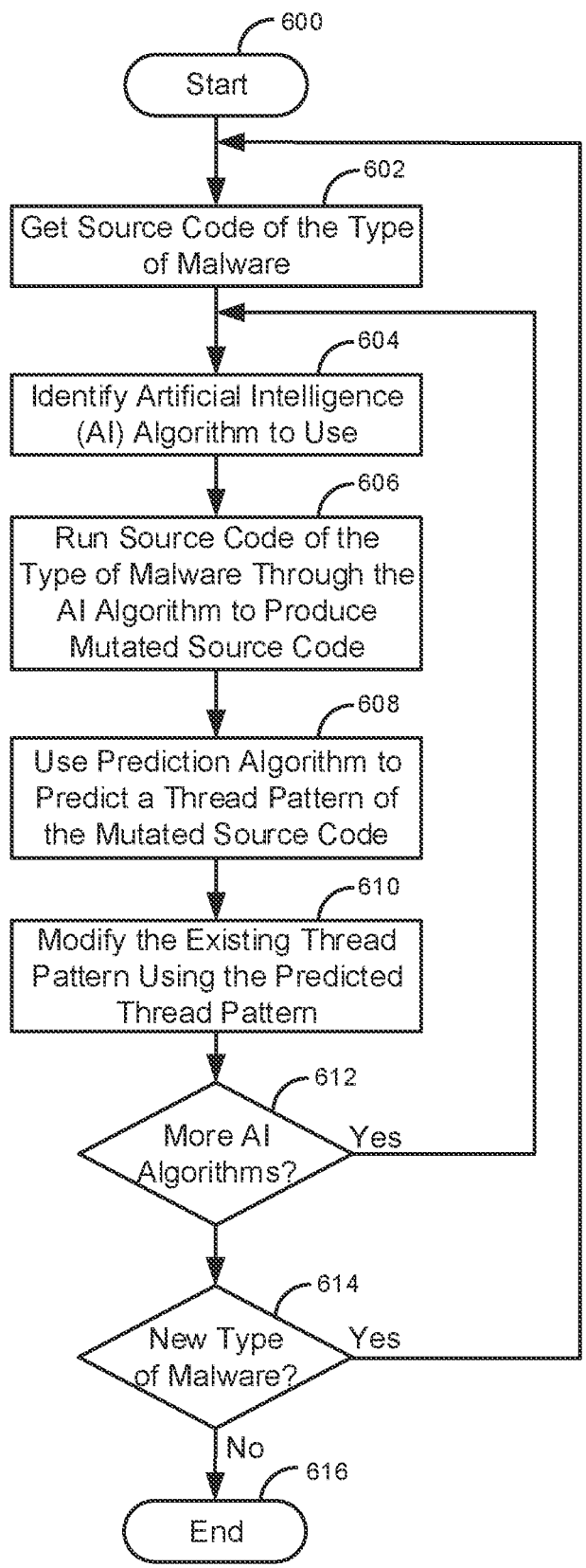
FIG. 6 is a flow diagram of a process for using Artificial Intelligence (AI) for creating mutations of a type of malware and predicting a thread pattern of the mutations of the type of malware.

The existing malicious thread pattern(s)/signature(s) may also comprise signatures of malware mutations as described in FIG. 6. The signatures of the malware mutations are used by the processes described in herein to identify AI generated mutations of different types of malware.

The AI algorithm(s) 122 are any AI algorithms 122 that can be trained using source code to produce new types of source code, such as, ChatGPT, ChatSonic, Jasper AI, Bard AI, Bing, CoPilot, and/or the like. The AI algorithms 122 may comprise one or more AI algorithms 122.

The malware code 123 is source code (e.g., a binary, Java source code, JavaScript source code, Jason source code, C++ source code, etc.) that is associated with a particular type of malware. There may be multiple instances of malware code 123 for different types of malware. The malware code 123 is used as an input to the AI algorithm(s) 122 for creating mutations and generating existing malicious signatures 121 of the type of malware. The created mutations/signatures 121 are used to detect potential future mutations of the type of malware.

The malware manager 124 can be or may include hardware coupled with software that can manage/control the existing malicious thread pattern(s)/signature(s) 121. The malware manager 124 can use the machine learning 125 to classify different existing malicious thread patterns/signatures 121.

The malware manager 124 further comprises machine learning 125. The machine learning 125 can be any type of machine learning, such as supervised machine learning, unsupervised machine learning, semi-supervised machine learning, reinforced machine learning, and/or the like. The malware manager 124 can use the machine learning 125 to define thresholds, ranges of thresholds, and/or variances, for the existing malicious thread patterns/signatures 121.

The malware manager 124 may build an inventory of operating system(s) 102, applications 106, hypervisor(s) 103, container(s) 104, virtual machine(s) 105, and/or the like that may contain malicious code. For example, the malware manager 124 may build an inventory of applications 106 from a docker image of a container 104 or virtual machine 105. The inventory may be used to retrieve specific types of existing thread patterns/signatures 121 that are associated with a specific type of application 106 from the thread pattern database 120. For example, a specific type of malware may be associated with the Linux operating system 102/library (e.g., a KLM). The thread pattern database 120 may have existing malicious thread patterns/signatures 121 associated with specific applications 106. The existing malicious thread pattern(s)/signatures 121 may be based on a specific operating system 102 that the application 106 is running on. In other words, there may be multiple existing malicious thread patterns 121/signatures for the same type of malware. The difference is that the context is different (where it is being used is differently). Alternatively, the existing malicious thread pattern(s)/signatures 121 may not have an associated application 106/library. The existing malicious thread pattern(s)/signature(s) 121 can be split up based on specific components. For example, a specific component/library may have a unique malicious thread pattern. The thread scanner 107 may periodically (or based on an event) go out and get the existing malicious thread patterns/signatures 121 from the thread pattern database 120. The thread pattern scanner 107 may also detect signatures 121.

In one embodiment, when a communication device 101 starts up, the thread scanner 107 goes out and retrieves the existing malicious thread patterns/signatures 121 from the thread pattern database 120 to see if there are any new existing malicious thread patterns/signatures associated with the inventory that the thread scanner 107 has created. If a percentage of the thread pattern is detected, a user may be notified and asked if he/she wants to take an action, such as, unloading the application 106, quarantining the application 106, and/or the like. For example, the user may indicate that if the 80% of the malicious thread pattern is detected to notify the user so the user can proactively address the issue.

The anomaly detection system 130 may be any anomaly detection system 130 that can identify any new anomalies on the network 110, such as Opentext's ArcSight Enterprise Security Manager. The anomaly detection system 130 may include (although not shown) modules on the communication devices 101A that are used to identify new anomalies on the communication devices 101/network 110. The anomaly detection system 130 may include packets sniffers on the network 110 for capturing/analyzing packet traffic on the network 110.

Although FIG. 1 shows the communication devices 101A-101N comprising operating systems 102A-102N, hypervisors 103A-103N, containers 104A-104N, virtual machines 105A-105N, and applications 106A-106N, as would be obvious to one of skill in the art, each individual communication device 101 may have various combinations of operating systems 102, hypervisors 103, containers 104, virtual machines 105, and applications 106.

Figure 2:
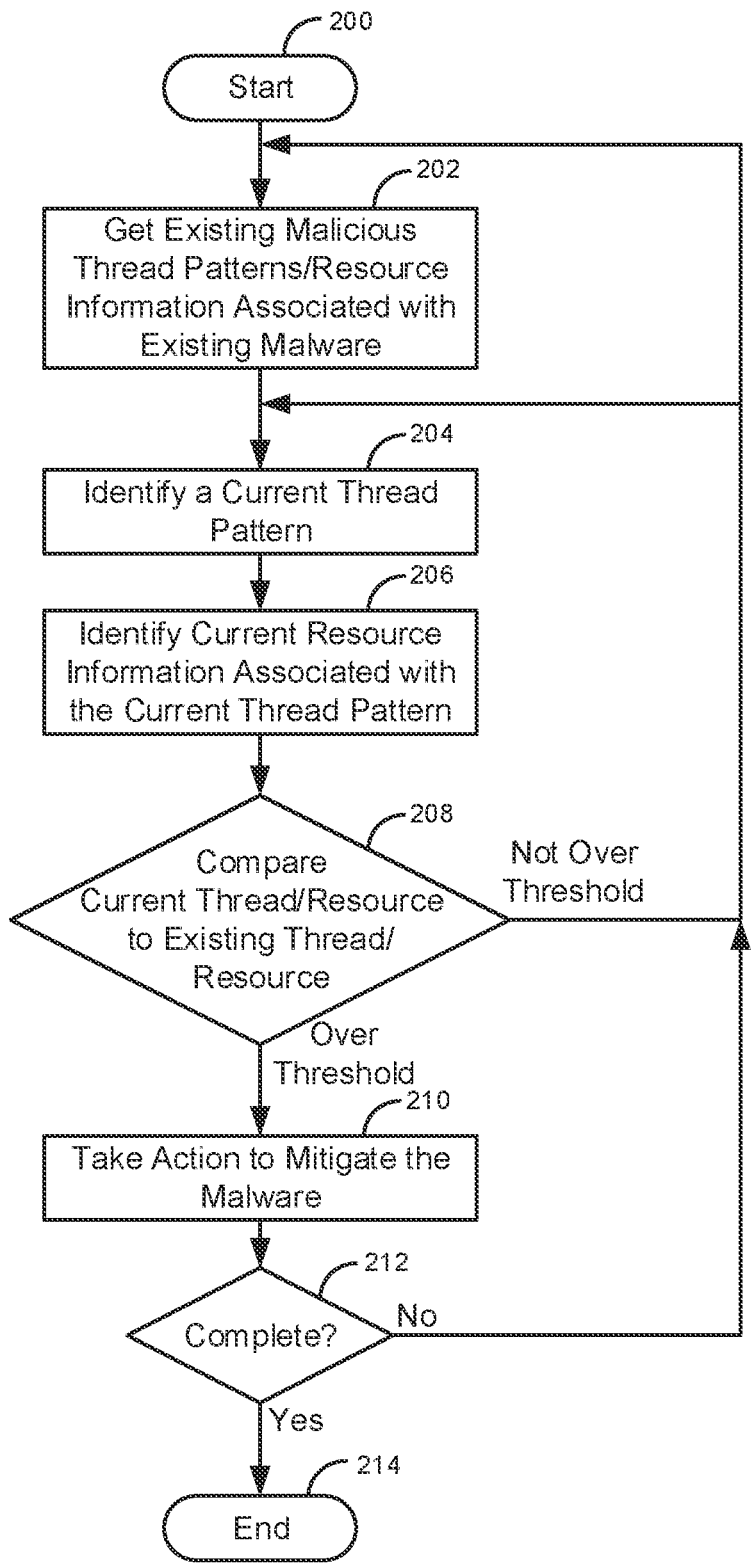
FIG. 2 is a flow diagram of a process for identifying malicious programs using thread patterns and related data.

FIG. 2 is a flow diagram of a process for identifying malicious programs using thread patterns and other related data. Illustratively, the communication devices 101A-101N, the operating systems 102A-102N, the hypervisors 103A-103N, the container(s) 104A-104N, the virtual machines 105A-105N, the applications 106A-106N, the thread scanners 107A-107N, the resource monitors 108A-108N, the thread pattern database 120, the AI algorithms 122, the malware code 123, the malware manager 124, the machine learning 125, and the anomaly detection system 130 are stored-program-controlled entities, such as a computer or microprocessor, which performs the method of FIGS. 2-9 and the processes described herein by executing program instructions stored in a computer readable storage medium, such as a memory (i.e., a computer memory, a hard disk, and/or the like). Although the methods described in FIGS. 2-9 are shown in a specific order, one of skill in the art would recognize that the steps in FIGS. 2-9 may be implemented in different orders and/or be implemented in a multi-threaded environment. Moreover, various steps may be omitted or added based on implementation.

The processes described herein can detect polymorphic (or mutating) malware because the malicious thread pattern will typically be similar. And even in the case that the thread patterns are different, the AI algorithms 122 can generate malicious mutants that are similar in function that can, in turn, yield a broader set of thread patterns/signatures that are used by these mutants for detection. Even though the signature (code) of the malware may have changed and may no longer be detectable using traditional methods, the malicious thread pattern/signatures of the mutated malware may still be similar to the malicious thread pattern of the unmutated malware. The processes described herein can be used to detect malware in different applications 106/components. For example, the malware may be in a library in one instance and in a separate application 106 that does not use the library in another instance.

The process starts in step 200. The thread scanner 107 gets (e.g., from the thread pattern database 120) the existing malicious thread pattern(s)/signature(s) 121 in step 202. The existing malicious thread pattern(s)/signature(s) 121 may also include existing malicious resource information associated with the existing malicious thread pattern(s)/signature(s) 121. In addition, the existing malicious thread pattern(s)/signature(s) 121 may also include threshold/variance information. The threshold/variance information is used in detection of the malware/mutated malware. The thread scanner 107 identifies, in step 204, a current thread pattern/signature. For example, the thread scanner 107 identifies a current thread pattern associated with an application 106 running in a container 104 or in virtual machine 105.

The resource monitor 108 identifies current resource information associated with the current thread pattern in step 206. The current thread patterns/signatures may be tied to specific resources that are used and/or modified by each thread. The current resource information may be captured while each specific thread is being executed or captured based on a signature. For example, a thread may spin off other threads, consume or allocate specific amounts of memory, have a specific disk I/O pattern, may send a defined number of packets per second, may access a specific port, may spawn off another container 104/virtual machine 105, may change the stack space/heap space/size, may create a number of connections, may change user access privileges, an inter server activity, and/or the like.

The thread scanner 107 compares the current thread pattern/signature/current resource information that is associated with the current thread pattern to the existing malicious thread pattern/signature 121/existing malicious resource information associated with the existing malicious thread pattern using a threshold(s)/variances. The threshold(s)/variances may be based on a percentage of how different the existing malicious thread pattern 121/signature is from the current thread pattern/signature. For example, if there are twenty threads in a specific order in the malicious thread pattern, there are nineteen threads (where one is missing) in the current thread pattern, and the threshold is a 90% match, this would be an indication that the type of malware is likely present. Likewise, a similar process may be used for comparing the malicious resource information to the current resource information/signature. For example, if the threshold is defined to be within an 80% average threshold, if the overall comparison is within the 80% average threshold, this indicates a likelihood that it matches the malware signature for this type of malware. The two comparisons are used to determine if threshold is met in step 208. If the comparison is not over the threshold in step 208, the process goes back to either step 204 or step 202. For example, depending on configuration, the process may see if there are any new malicious thread patterns/signatures in step 202 (e.g., daily). Otherwise, the process goes to step 204 to continue to identify a current thread pattern/signature.

The overall threshold may be based on a threshold for each type of resource/parameter. For example, there may be a within 80% threshold for CPU usage, a within 70% diskspace usage threshold, an over twenty connection threshold, a port range threshold, a number of packets sent/received threshold, a number of accounts created/deleted threshold, and/or the like. These may be summed up to produce an overall resource threshold (e.g., a score). Likewise, the thread/signature comparison may consider different attributes associated with the threads, such as a number of missing threads (specific number or percentage), a number of additional threads (specific number or percentage), same threads, but in a different order (e.g., flag this or not), time between threads, overall effect on target, and/or the like.

If the comparison is over the threshold(s), the thread scanner 107 takes an action to mitigate the malware in step 210. For example, the thread scanner 107 may quarantine the malware, may remove the malware, may send a notification to a user, may block a port, may unload an application 106, may unload a library, may shut down one or more connections, may block an Internet Protocol (IP) address, may disable a user account, may deny access to a resource (e.g., an application 106, a hypervisor 103, a container 104, a virtual machine 105, etc.), and/or the like.

The thread scanner 107 determines, in step 212, if the process is complete. If the process is not complete in step 212, the process goes to step 202/204 (like discussed above). Otherwise, if the process is complete in step 212, the process ends in step 214.

The process of FIG. 2 could be used in the test development cycle to identify new variations of malware. For example, as an organization develops new code (e.g., brings in new open-source components), the code in development is scanned in real-time to determine if there are any potential new types of malware/signatures that have a similar thread patterns/characteristics.

Figure 3:
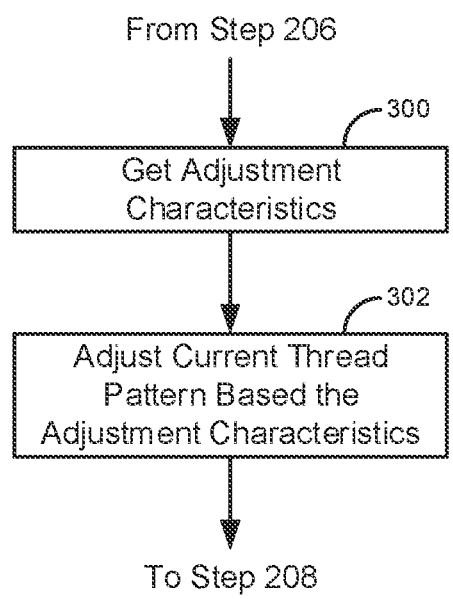
FIG. 3 is a flow diagram of a process for adjusting a thread pattern based on adjustment characteristics.

FIG. 3 is a flow diagram of a process for adjusting a thread pattern based on adjustment characteristics. The process of FIG. 3 is an exemplary embodiment that goes between steps 206 and 208 of FIG. 2. After identifying the current resource information associated with the current thread pattern/signature in step 206, The resource monitor 108 gets adjustment characteristics in step 300 (e.g., from the thread pattern database 120). The adjustment characteristics are based on how the thread patterns/signatures vary when running on different resources, such as, different operating systems 102, different container types, different virtual machine types, different hypervisors 103, different CPU types/speeds, multiple processing cores, different types of memory, different a memory access times, different disk space (e.g., disk access time), different network interface capability, and/or the like.

The current thread pattern/signature is adjusted based on the specific types of resources being used in step 302. For example, if the CPU speed is 80% of what the existing malware resource is based on, the thread pattern time may be adjusted to compensate for running on a slower speed CPU. Another example may be where a thread pattern varies based on the type of hypervisor 103 used by a specific type of container 104. This makes the comparison between the current thread pattern and the existing malicious thread pattern 121 more realistic and improves the malware detection process. In one embodiment, instead of the current thread pattern being adjusted, the existing malware thread pattern may be adjusted. The process then goes to step 208 of FIG. 2.

Figure 4:
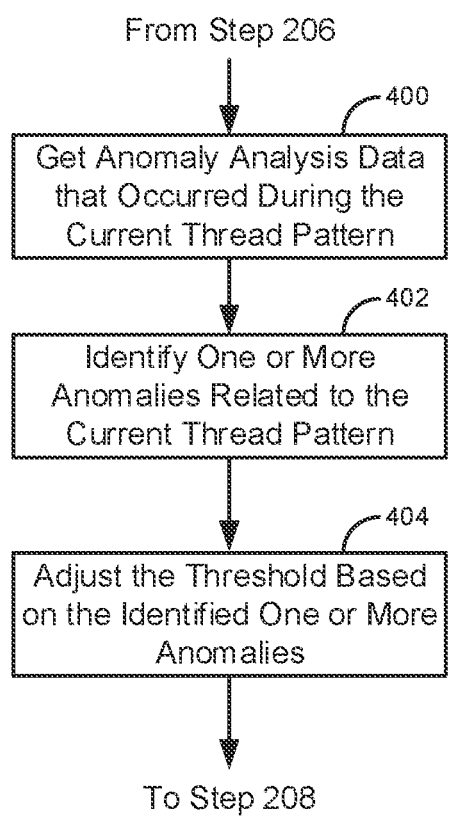
FIG. 4 is a flow diagram of a process for using anomaly analysis data to further identify a malicious program by adjusting a threshold.

FIG. 4 is a flow diagram of a process for using anomaly analysis data to further identify a malicious program by adjusting a threshold(s). The process of FIG. 4 goes between steps 206 and 208 of FIG. 2. The process of FIG. 4 may also work in conjunction with the process described in FIG. 3.

After identifying the current resource information associated with the current thread pattern in step 206, the thread scanner 107 gets, in step 400, anomaly analysis data that occurred during the current thread pattern in step 400. For example, the thread scanner 107 may get the anomaly analysis data from the anomaly detection system 130. The thread scanner 107 identifies one or more anomalies related to the current thread pattern/signature in step 402. For example, the thread scanner 107 may identify an anomaly by comparing it to a history of anomaly analysis data on the network 110 before the current thread pattern/signature was identified. The threshold(s) is adjusted based on the identified one or more anomalies in step 404. For example, the threshold may be lowered if the anomaly analysis data shows new anomalies on the network 110 occurred during the current thread pattern where the new anomalies did not previously exist. The process then goes to step 208 of FIG. 2.

To illustrate, consider the following example. If a possible mutation has been identified, the thread scanner 107/anomaly detection system 130 may do an anomaly analysis of the communication device(s) 101/network 110 during the time that the mutation is running to identify any new anomalies that have occurred/are occurring in relation to the malicious/mutated thread pattern/signature/current thread pattern. If there are new anomalies in addition to the detected possible mutation, this may be used as an additional factor in identifying that the malware is likely a mutant variant (or even a new type of malware) or something that needs to be looked at by a security analyst. A potential anomaly score could be increased. For example, the potential anomaly score could be increased from 80% to 85% based on the anomaly analysis.

Figure 5:
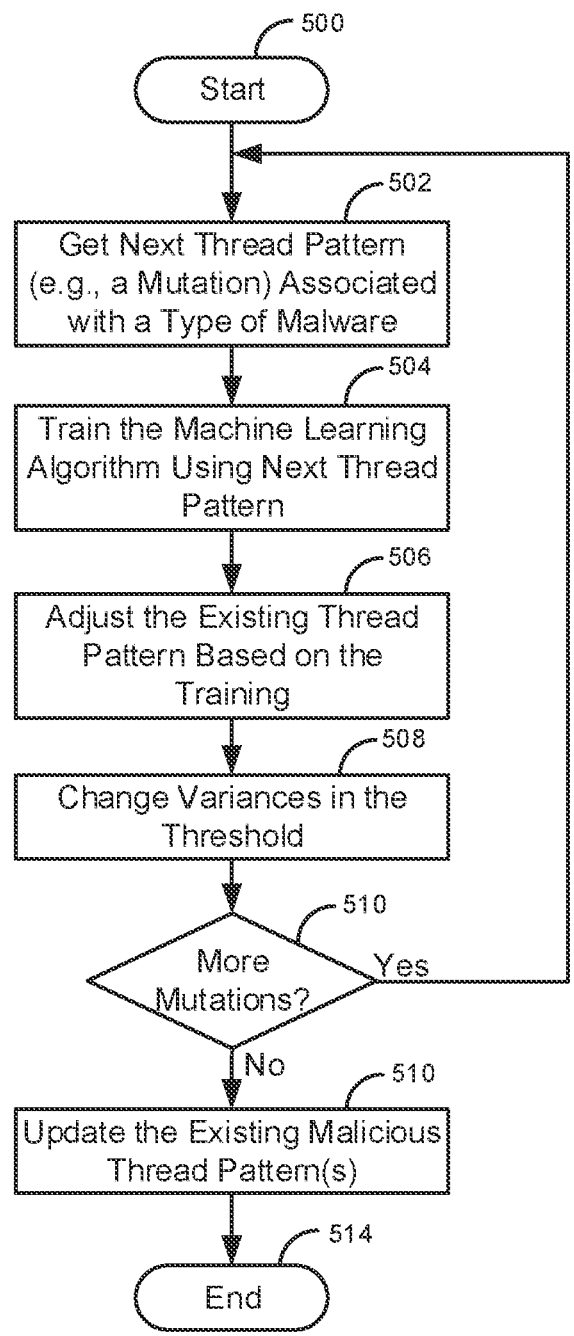
FIG. 5 is a flow diagram of a process that adjusts a thread pattern based on mutations of a type of malware.

FIG. 5 is a flow diagram of a process that adjusts a thread pattern based on mutations of a type of malware. The process starts in step 500. The malware manager 124 gets the original malicious thread pattern (e.g., for the first time) or the next mutation of the existing type of malware in step 502. The malware manager 124 trains the machine learning 125 using the existing malicious thread pattern 121/existing malicious information (new/original) in step 504.

The malware manager 124 adjusts the existing malicious thread pattern 121 (if not the first time) in step 506. For example, the malware manager 124 may adjust the threshold from a specific number of threads that are created to a range of the number of threads created by the type malware. In addition, other parameters may be changed, such as, timing between threads, an order of threads being created (e.g., there may be two variances for this particular parameter), and/or the like.

The malware manager 124 changes the threshold/variances in the threshold in step 508. For example, the overall threshold may be adjusted up or down, an individual threshold may be adjusted up or down (e.g., the number of threads), the threshold may be changed to a range, and/or the like. This may be the result of a mutation of the malware adding an extra thread. In one embodiment, a set of existing malicious thread patterns 121 may be created for a specific type of malware if there are large variances in the existing malicious thread patterns 121/malicious information in step 506. The process of FIG. 5 may also include variances to the malicious resource information. For example, the CPU usage threshold may be changed to a lower threshold, or a range based on the machine learning of the mutated version of the malware.

The malware manager 124 determines, in step 510, if there are more mutations of the type of malware. If there are more mutations, in step 510, the process goes back to step 502. Otherwise, if there are no more mutations in step 510, the malware manager 124 updates the existing malicious thread patterns/signatures 121, in step 512, and the process ends in step 514.

FIG. 6 is a flow diagram of a process for using Artificial Intelligence (AI) for creating mutations of a type of malware and predicting a thread pattern/signature of the mutations of the type of malware. The process starts in step 600. The malware manager 124 gets source code of the type of malware (malware code 123) in step 602. For example, the malware code 123 may be written in Java or some other programming language. The malware manager 124 identifies an AI algorithm 122 to use in step 604. For example, the AI algorithm 122 may be ChatGPT.

The malware manager 124 runs the source code of the type of malware (malware code 123) through the AI algorithm 122 to produce mutated source code for the type of malware in step 606. For example, the malware source code could be provided to the AI algorithm with a request to generate a different version of code that performs the same function.

The malware manager 124 uses a prediction algorithm to predict a thread pattern of the mutated source code in step 608. For example, the prediction algorithm may be a Generative Adversarial Network (GAN) that is trained on how thread patterns are created based on existing source code. The malware manager 124 modifies the existing malicious thread pattern/signature 121 based on the predicted thread pattern/signature in step 610. For example, using a similar process as described in FIG. 5.

The malware manager 124 determines, in step 612, if there are more AI algorithms 122 to create more mutated source code (e.g., ChatSonic). If there are more AI algorithms 122 in step 612, the process goes back to step 604 to repeat the process using the next AI algorithm 122.

Otherwise, if there are no more AI algorithms 122 in step 614, the malware manager 124 determines, in step 614, if there are additional/new types of malware. If there are additional/new types of malware in step 614, the process goes to step 602 to repeat the process for the additional/new types of malware. Otherwise, if there are no new/additional types of malware in step 614, the process ends in step 616.

The process of FIG. 6 may also generate multiple mutants of source code using the same AI algorithm 122. The process may repeat for each mutation that is generated using the same source code of the malware.

While the process of FIG. 6 is described using thread patterns as one example, the generation of multiple mutant versions of source code can be applied generically to detect different types of malware/anomalies. For example, in step 608, the prediction algorithm may be used to generate a new predicted virus pattern, a new predicted memory usage/range, a new predicted thread pattern/variations, a new predicted disk usage/ranges, a new predicted packet creation/ranges, a new predicted login usage/ranges, a new predicted account creation/ranges, any type of feature/resource described herein and/or the like. Likewise, the process of step 610 may modify the attributes/variations based on the generated mutations of the source code. This may include changing ranges/variations, adding new ranges/variations, creating a completely new sets of signatures/ranges based on the different code mutations, and/or the like. The new predictions may be referred to as a signature. The signature may also be based on a type of operating system, a type of container, a type of hypervisor, a type of virtual machine, a type of a central processing unit, a speed of the central processing unit, a type of memory, a memory access time, a disk access time, a network interface access time, a thread pattern, a use of memory, a use of disk space, a number of packets, a use of a specific port, a spawning of a container, a spawning of a virtual machine, a heap size, a stack size, a number of connections, a change in access privileges, an inter-server activity, a user login activity, user accounts being deleted, new user accounts being created, and/or the like.

The output of FIG. 6 is used to identify new mutations of malware in real-time as they become active on the network 110 by comparing the learned signatures to new signatures. This allows the system to proactively identify new mutations of the malware.

In addition, the process of FIG. 6 may use a Generative Adversarial Network (GAN) where the training data is a large set of malicious code. For example, the large set of malicious code may be data from the malware workbench.

Figure 7:
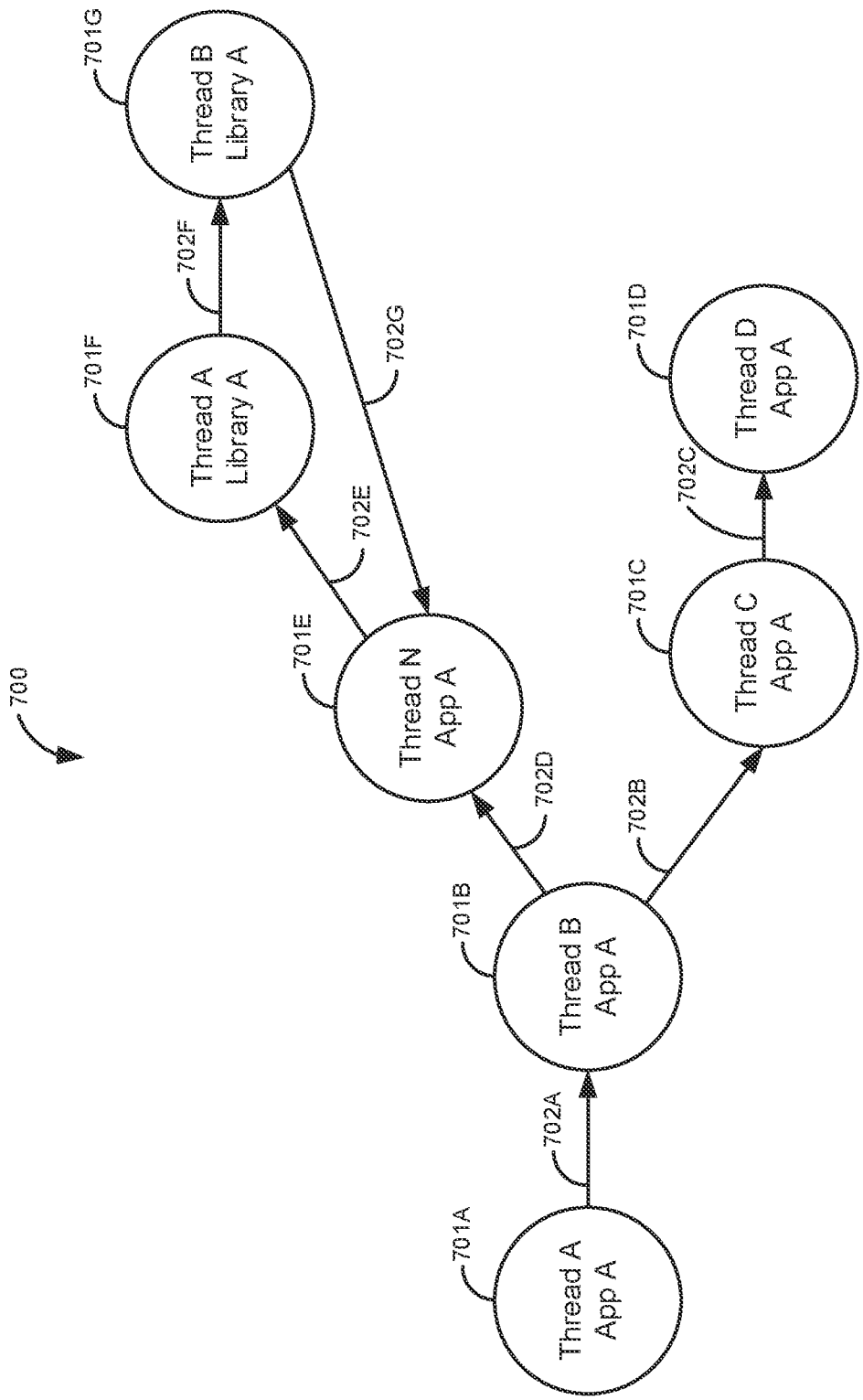
FIG. 7 is a diagram of a Graph Neural Network (GNN) of a thread pattern.

FIG. 7 is a diagram of a Graph Neural Network (GNN) 700 of a thread pattern. The GNN 700 is an exemplary GNN 700 that is displayed to a user (e.g., in a user interface). In FIG. 7, the thread pattern shows an inter-process thread pattern between the application 106A and a shared library. The thread pattern in the GNN 700 may be for an existing malicious thread pattern 121 or a current thread pattern.

The GNN 700 comprises nodes 701A-701G. The nodes 701A-701E represent threads created by the application 106A. The nodes 701F-701G represent threads created by the library A. The GNN 700 shows the relationship between the threads and each software component that is generating threads. For example, the threads represented by the nodes 701A-701E are generated by the application 106A and the threads represented by the nodes 701F-701G are generated by the library A that the application 106A calls.

The links 702A-702G represent a flow of the threads. Although not shown for convenience, the links 702A-702G between each thread may have associated information for each thread, such as, function calls where the thread is created, stack size, heap size, memory usage, time stamps, packets sent, disk space usage, user logins, and/or the like. In addition, the links 702A-702G may show other information, such as new anomalous data that occurred when the thread was created. The link information may also be used when comparing thread patterns as described in FIG. 9. For example, the comparison may use the thresholds when identifying a malicious thread pattern. This information may be used to create thresholds when the thread varies to predict a likelihood of a mutant type of malware.

The GNN 700 of FIG. 7 may be extended to show where multiple applications 106 call the same library. In this case, the malware may be activated based on a second application 106 accessing the library or the second application 106 accessing the same or a different set of Application Programming Interfaces (APIs) in the library. In this case, the existing malicious thread pattern 121 will include multiple applications 106 accessing the shared library as part of the malware thread detection process.

Figure 8:
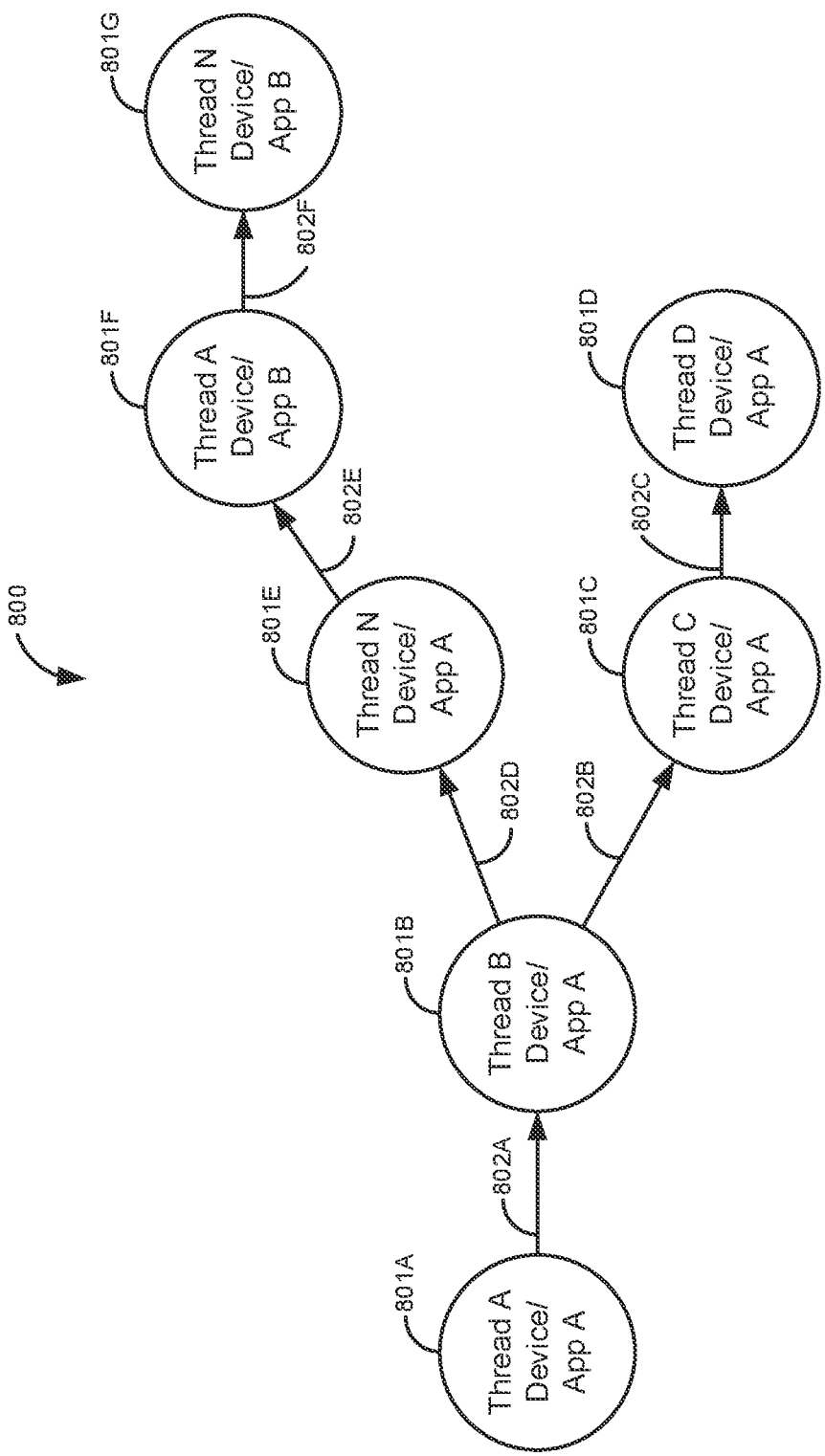
FIG. 8 is a diagram of a Graph Neural Network (GNN) of a thread pattern across multiple communication devices.

FIG. 8 is a diagram of a Graph Neural Network (GNN) 800 of a thread pattern across multiple communication devices 101. The existing malicious thread pattern 121 may be a multi-device malicious thread pattern (e.g., a client/server thread pattern) as shown in FIG. 8. The GNN 800 is an exemplary GNN 800 that is displayed to a user. The thread pattern in the GNN 800 may be for an existing malicious thread pattern 121 or for a current thread pattern.

In FIG. 8, GNN 800 the comprises nodes 801A-801G. The nodes 801A-801E represent threads created by the application 106A and the nodes 801F-801G represent threads created by the application 106B. The GNN 800 shows the relationship between the threads and each software component that is generating threads.

The links 802A-802F represent a flow of the threads. Although not shown for convenience, the links 802A-702F between each thread may have associated information, such as, function calls where the thread is created, stack size, heap size, memory usage, time stamps, packets sent, disk space usage, user logins, and/or the like. In addition, the links 802A-802F may show other information, such as new anomalous data that occurred when the thread was created.

The detection of two thread patterns on two different communication devices 101 may constitute a match of a malicious thread pattern of a known type malware. The link between the communication devices 101A/B (i.e., link 802E) is not based on a thread, but instead based on code execution. In this embodiment, the thread scanners 107 on different communication devices 101 can be used to identify the multi-communication device malicious thread pattern. In addition, detection of the same existing malicious thread pattern on multiple communication devices 101 may constitute a network attack. A system thread monitor is used to identify the coordinated network attack by notifying a security analyst and/or taking a specific action, such as quarantining the application(s) 106 on multiple devices.

The malicious thread patterns may be based on individual threads, dependent threads, cross application threads, threads that use mutex locks, and/or the like. The malicious thread patterns may be generated by a container 104 or virtual machine 105. The malicious thread patterns may constitute inter-container/virtual machine threads instead of inter communication device threads. For example, the existing malicious thread pattern 121 may comprise a thread from the container 104A that provides information to the container 104B (e.g., an authentication container 104 that authenticates for a plurality of applications 106 in different containers 104). The thread patterns may include where a container 104 spawns another container 104. The thread patterns may be compared between container 104/virtual machines 105 running on the same environment/hypervisor 103.

In FIGS. 7-8, the diagrams use the GNN to generate the information. However, in other embodiments, a Large Language Model (LLM) and/or a Recurrent Neural Network (RNN) can be used to generate the GUI.

In addition to thread patterns, the GNN/LLM/RNN data may be displayed based on the process of FIG. 6. For example, instead of thread patterns, virus signatures, memory signatures, packet signatures, disk usage patterns, user login data, account creation data, and/or the like may be displayed to the user based on the process described in FIG. 6. If a new mutation is identified, the predicted signatures of FIG. 6 may be ranked and displayed to the user based on how closely the predicted signatures of the mutated code match the signature of a suspected mutation of the malware.

Figure 9:
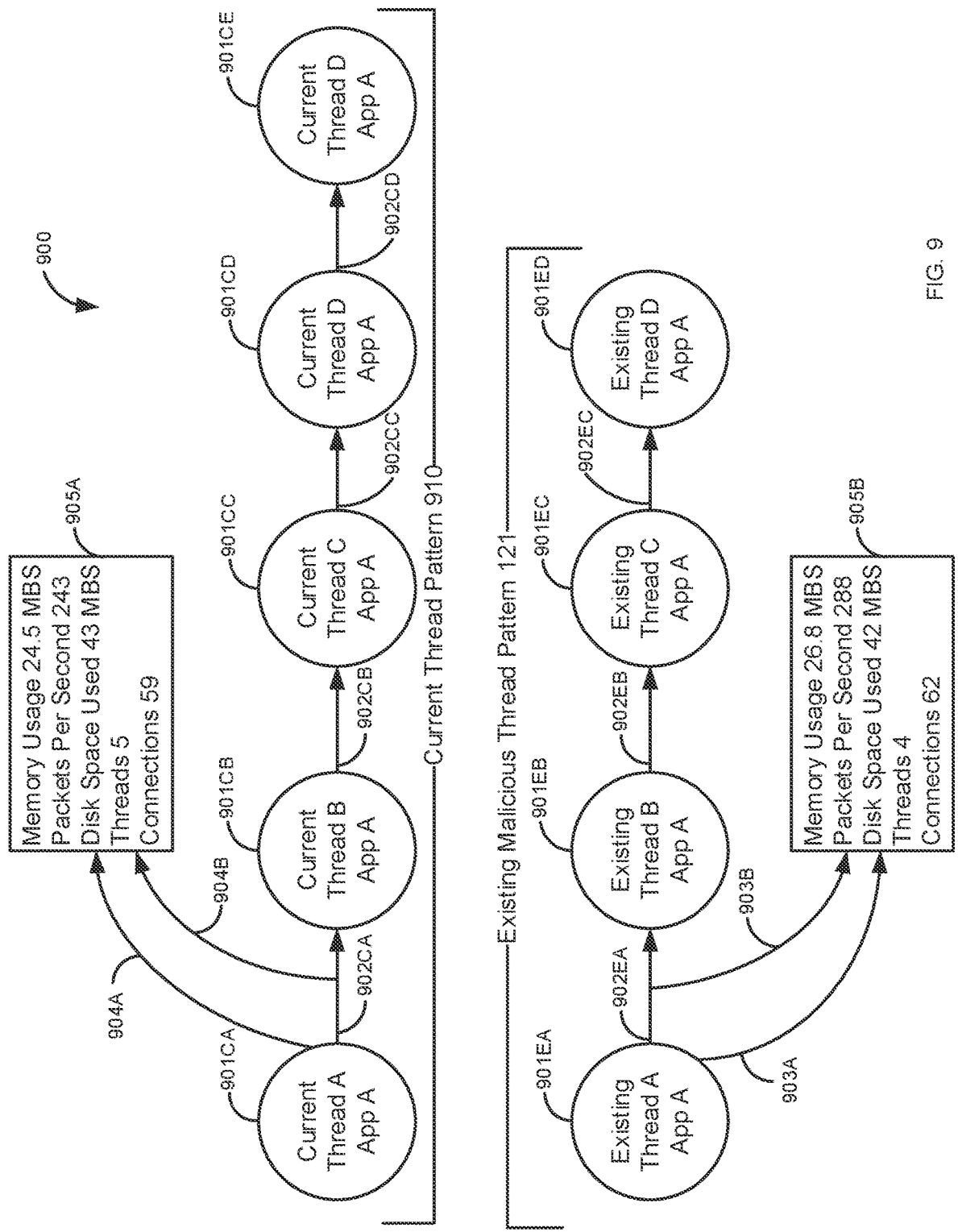
FIG. 9 is an exemplary graphical user interface where a current thread pattern is compared to an existing malicious thread pattern.

FIG. 9 is an exemplary Graphical User Interface (GUI) 900 where a current thread pattern 910 is compared to an existing malicious thread pattern 121. The GUI 900 also uses a GNN. The GUI 900 comprises nodes 901CA-901CE, nodes 901EA-901ED, links 902CA-902CD, links 902EA-902EC, resource comparison windows 905A-905B, a current thread pattern 910, and the existing malicious thread pattern 121.

The nodes 901CA-901CE represent threads of the current thread pattern 910. The links 902CA-902CD represent a flow of the threads for the current thread pattern 910. Likewise, the nodes 901EA-901ED represent threads of the existing malicious thread pattern 121. The links 902EA-902EC represent a flow of the threads for the existing malicious thread pattern 121.

Comparing the existing malicious resource information to the current resource information can be done by selecting the link 902CA in step 904B and selecting the link 902EA in step 903B to display the resource comparison windows 905A-905B. Here a user can determine how each of the resources compare to each other.

The example of FIG. 9 is just one exemplary way to display the information. For example, the system could display an overlay (or show side by side) of the current thread pattern versus the library thread pattern (e.g., using the GNN) and show the characteristics that are similar, those that vary, new anomalies detected, and/or the like. In one embodiment, instead of clicking on the links 902, the user could look at the details of each thread by selecting on an individual node 901. For example, as shown in FIG. 9, the user can select the nodes 901CA/901EA in steps 904A/903A to display the resource comparison windows 905A-905B.

In addition, the GUI 900 can give an estimate as to the likelihood that this is a mutated variant of the malware (e.g., a 90% likelihood). The GUI 900 could also indicate the severity of the malware and the possible impact on the network 110/communication device(s) 101. This can include how much it varies versus the existing thread pattern/characteristics. The GUI 900 allows a user to make a judgement call based on the user's knowledge of the system to better determine what action(s) to take. The overlay would also display a list of potential malware matches and an order/ranking on relatedness. For example, the overlay may show two potential malware matches and their respective likelihood that the current thread pattern is a match.

The GUI 900 may also work similarly using the data generated in FIG. 6. For example, instead of a thread pattern, an existing malicious signature (e.g., a virus signature) may be compared to a current signature. Likewise, the user may click on the links 902/nodes 901 to display the resource information associated with the signature.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:
a microprocessor; and
a computer readable medium, coupled with the microprocessor and comprising microprocessor readable and executable instructions that, when executed by the microprocessor, cause the microprocessor to:
receive source code for a type of malware;
identify an Artificial Intelligence (AI) algorithm based on the type of malware;
run the source code of the type of malware through the AI algorithm to produce mutated source code for the type of malware, the mutated source code having an unknown signature when executed; and
use a prediction algorithm to predict a signature of the mutated source code for the type of malware when executed, the predicted signature comprising one or more of: a virus pattern, a thread pattern, a use of memory, a use of disk space, a number of packets, a use of a specific port, a spawning of a container, a spawning of a virtual machine, a heap size, a stack size, a number of connections, a change in access privileges, an inter-server activity, a user login activity, user accounts being deleted, and new user accounts being created, wherein the AI algorithm produces a plurality of mutated versions of source code for the type of malware, and wherein each selected mutated version of the source code has a plurality of corresponding predicted signatures.

2. The system of claim 1, wherein the predicted signature of the mutated source code for the type of malware comprises a plurality of: a virus pattern, a thread pattern, a use of memory, a use of disk space, a number of packets, a use of a specific port, a spawning of a container, a spawning of a virtual machine, a heap size, a stack size, a number of connections, a change in access privileges, an inter-server activity, a user login activity, user accounts being deleted, and new user accounts being created.

3. The system of claim 1, wherein the predicted signature of the mutated source code for the type of malware depends on one or more of: a type of operating system, a type of container, a type of hypervisor, a type of virtual machine, a type of a central processing unit, a speed of the central processing unit, a type of memory, a memory access time, a disk access time, and a network interface access time.

4. The system of claim 1, wherein the mutated source code comprises multiple mutated versions of source code, and wherein each of the predicted corresponding signatures is associated with a discrete set of resources compared to other predicted corresponding signatures for the selected mutated version of the source code, the discrete set of resources comprising a plurality of operating system, container type, virtual machine type, hypervisor, CPU type, CPU speed, processing core, memory type, memory access time, disk space, and network interface capability.

5. The system of claim 1, wherein the AI algorithm comprises a plurality of different AI algorithms that each produce one or more different mutated versions of source code for the type of malware, wherein the mutated source code comprises multiple mutated versions of source code, and wherein each of the corresponding predicted signatures is associated with a discrete set of resources compared to other predicted corresponding signatures for the selected mutated version of the source code, the discrete set of resources comprising a plurality of operating system, container type, virtual machine type, hypervisor, CPU type, CPU speed, processing core, memory type, memory access time, disk space, and network interface capability.

6. The system of claim 1, wherein the predicted signature of the mutated source code for the type of malware comprises a plurality of signatures of a plurality of mutated source codes for the type of malware and wherein the prediction algorithm is trained on a plurality of types of malwares.

7. The system of claim 1, wherein the prediction algorithm is a Generative Adversarial Network (GAN) that is trained on a large set of malicious code from a malware workbench and wherein the executable instructions that, when executed by the microprocessor, cause the microprocessor to determine a threshold for comparing a newly identified signature of malware against the predicted signature by aggregating a score associated with plural resources impacted by the newly identified signature of the malware.

8. The system of claim 1, wherein the mutated source code comprises multiple mutated versions of source code, wherein each of the corresponding predicted signatures is associated with a discrete set of resources compared to other predicted corresponding signatures for the selected mutated version of the source code, and wherein the executable instructions that, when executed by the microprocessor, cause the microprocessor to identify a current set of resources associated with a newly identified signature of a malware, map the discrete set of resources against discrete sets of resources for the plurality of corresponding predicted signatures, select a predicted signature from among the plurality of corresponding predicted signatures, and compare the predicted signature of the mutated source code for the type of malware to the newly identified signature of a malware.

9. The system of claim 1, wherein a newly identified signature of the malware is ranked in comparison with a plurality of identified signatures of a plurality of mutated source codes for the type of malware.

10. A method comprising:
receiving, by a microprocessor, source code for a type of malware;
identifying by the microprocessor, an Artificial Intelligence (AI) algorithm based on the type of malware;
running, by the microprocessor, the source code of the type of malware through the AI algorithm to produce mutated source code for the type of malware, the mutated source code having an unknown signature when executed; and
using, by the microprocessor, a prediction algorithm to predict a signature of the mutated source code for the type of malware when executed, the predicted signature comprising one or more of: a virus pattern, a thread pattern, a use of memory, a use of disk space, a number of packets, a use of a specific port, a spawning of a container, a spawning of a virtual machine, a heap size, a stack size, a number of connections, a change in access privileges, an inter-server activity, a user login activity, user accounts being deleted, and new user accounts being created, wherein the AI algorithm produces a plurality of mutated versions of source code for the type of malware, and wherein each selected mutated version of the source code has a plurality of corresponding predicted signatures.

11. The method of claim 10, wherein the predicted signature of the mutated source code for the type of malware comprises a plurality of: a virus pattern, a thread pattern, a use of memory, a use of disk space, a number of packets, a use of a specific port, a spawning of a container, a spawning of a virtual machine, a heap size, a stack size, a number of connections, a change in access privileges, an inter-server activity, a user login activity, user accounts being deleted, and new user accounts being created.

12. The method of claim 10, where the predicted signature of the mutated source code for the type of malware depends on one or more of: a type of operating system, a type of container, a type of hypervisor, a type of virtual machine, a type of a central processing unit, a speed of the central processing unit, a type of memory, a memory access time, a disk access time, and a network interface access time.

13. The method of claim 10, wherein the mutated source code comprises multiple mutated versions of source code, and wherein each of the predicted corresponding signatures is associated with a discrete set of resources compared to other predicted corresponding signatures for the selected mutated version of the source code, the discrete set of resources comprising a plurality of operating system, container type, virtual machine type, hypervisor, CPU type, CPU speed, processing core, memory type, memory access time, disk space, and network interface capability.

14. The method of claim 10, wherein the AI algorithm comprises a plurality of different AI algorithms that each produce one or more different mutated versions of source code for the type of malware, wherein the mutated source code comprises multiple mutated versions of source code, and wherein each of the corresponding predicted signatures is associated with a discrete set of resources compared to other predicted corresponding signatures for the selected mutated version of the source code, the discrete set of resources comprising a plurality of operating system, container type, virtual machine type, hypervisor, CPU type, CPU speed, processing core, memory type, memory access time, disk space, and network interface capability.

15. The method of claim 10, wherein the predicted signature of the mutated source code for the type of malware comprises a plurality of signatures of a plurality of mutated source codes for the type of malware and wherein the prediction algorithm is trained on a plurality of types of malwares.

16. The method of claim 10, wherein the prediction algorithm is a Generative Adversarial Network (GAN) that is trained on a large set of malicious code from a malware workbench and further comprising determining a threshold for comparing a newly identified signature of malware against the predicted signature by aggregating a score associated with plural resources impacted by the newly identified signature of the malware.

17. The method of claim 10, wherein the mutated source code comprises multiple mutated versions of source code, wherein each of the corresponding predicted signatures is associated with a discrete set of resources compared to other predicted corresponding signatures for the selected mutated version of the source code, and further comprising identifying a current set of resources associated with a newly identified signature of a malware, mapping the discrete set of resources against discrete sets of resources for the plurality of corresponding predicted signatures, selecting a predicted signature from among the plurality of corresponding predicted signatures, and comparing the predicted signature of the mutated source code for the type of malware to the newly identified signature of a malware.

18. The method of claim 10, wherein a newly identified signature of the malware is ranked in comparison a plurality of identified signatures of a plurality of mutated source codes for the type of malware.

19. A non-transient computer readable medium having stored thereon instructions that cause a processor to execute a method, the method comprising instructions to:
   identify a current thread pattern;
   receive source code for a type of malware;
   identify an Artificial Intelligence (AI) algorithm based on the type of malware;
   run the source code of the type of malware through the AI algorithm to produce mutated source code for the type of malware, the mutated source code having an unknown signature when executed; and
   use a prediction algorithm to predict a signature of the mutated source code for the type of malware when executed, the predicted signature comprising one or more of:
   a virus pattern, a thread pattern, a use of memory, a use of disk space, a number of packets, a use of a specific port, a spawning of a container, a spawning of a virtual machine, a heap size, a stack size, a number of connections, a change in access privileges, an inter-server activity, a user login activity, user accounts being deleted, and new user accounts being created, wherein the AI algorithm produces a plurality of mutated versions of source code for the type of malware, and wherein each selected mutated version of the source code has a plurality of corresponding predicted signatures.

20. The non-transient computer readable medium of claim 19, wherein the mutated source code comprises multiple mutated versions of source code, wherein each of the corresponding predicted signatures is associated with a discrete set of resources compared to other predicted corresponding signatures for the selected mutated version of the source code, and the instructions identify a current set of resources associated with a newly identified signature of a malware, map the discrete set of resources against discrete sets of resources for the plurality of corresponding predicted signatures, select a predicted signature from among the plurality of corresponding predicted signatures, and compare the selected predicted signature of the mutated source code for the type of malware to the newly identified signature of a malware.

* * * * *